J. W. JEPSON.
SYSTEM OF ELECTRICAL DISTRIBUTION.
APPLICATION FILED APR. 30, 1906.
981,198.
Patented Jan. 10, 1911.
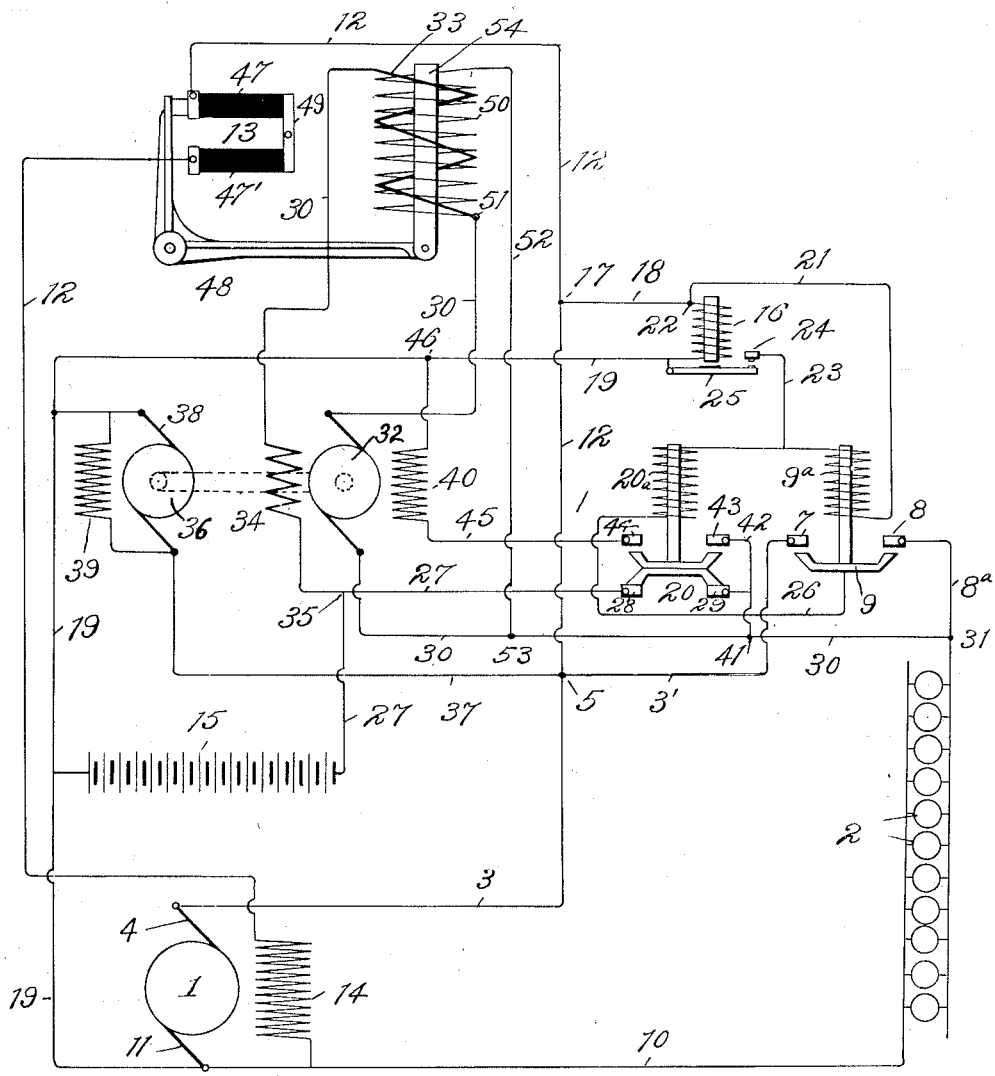
WITNESSES:
H. C. Workman
P. F. Sonnek
INVENTOR
John W. Jepson
BY Knight Bros
his ATTORNEYS

UNITED STATES PATENT OFFICE.

JOHN W. JEPSON, OF NEW YORK, N. Y., ASSIGNOR, BY MESNE ASSIGNMENTS, TO GOULD COUPLER COMPANY, A CORPORATION OF NEW YORK.

SYSTEM OF ELECTRICAL DISTRIBUTION.

981,198.  Specification of Letters Patent.  Patented Jan. 10, 1911.

Application filed April 30, 1906. Serial No. 314,531.

*To all whom it may concern:*

Be it known that I, JOHN W. JEPSON, a citizen of the United States, and a resident of the city, county, and State of New York, have invented certain new and useful Improvements in Systems of Electrical Distribution; and in order that those skilled in the art may understand and practice my invention I give the following specification.

My invention relates to systems of electrical distribution in which a generator is employed to supply current to a lighting or other consumption circuit, and in which the generator voltage is automatically regulated to the requirements of the consumption circuit, and auxiliary devices are provided for supplying the consumption circuit at times when the generator voltage is too low or when the generator is not working.

The object of my invention is to provide a system of the character indicated with automatically acting devices for regulating the voltage of the generator, for controlling the connection of the generator with the consumption circuit and for regulating the operation of the auxiliary devices.

In the embodiment of my invention herein illustrated and described, the same is particularly adapted to a car lighting system in which the generator is driven at a variable speed by any of the ordinary and well known means from the car axle; while the present form of my invention is particularly adapted for this purpose, the invention is not restricted to this use, but may be used in any distribution system where its peculiar advantages may be desired.

In the accompanying drawing, I have illustrated diagrammatically a system embodying my invention suitable for use in car lighting.

Referring to the drawing, 1 indicates the generator which is connected to the lighting circuit 2 by conductor 3, leading from brush 4 to contacts 7 and 8 of circuit closer 9, through the lights 2 and conductor 10 back to the other brush 11. From point 5 in this circuit leads conductor 12, which includes the variable resistance device 13 and generator field coil 14, and connects with the other side of the generator circuit at a point in conductor 10. Connected across the generator circuit is a voltage responsive device 16, the circuit of which is from point 17 in conductor 12 through connection 18, the coil of device 16, conductor 19, back to brush 11 of the dynamo. Device 16 controls circuit closers 9 and 20 by means of a connection 21 leading from a point 22 in conductor 18 through the coil 9ª of the closer 9, connection 23, contact 24, armature 25 of the device 16 to connection 19 and back to brush 11 of the generator. The circuit of closer 20 is from the contact 8 through circuit closer 9, conductor 26, coil 20ª of the closer 20, connection 23, contact 24, armature 25, conductor 19 back to brush 11 of the generator.

A storage battery 15 is connected across the circuit by connections 27, through contact 28, closer 20, contact 29, conductor 30, to the lighting circuit 2. In the drawing, the system is represented with the generator not working at a sufficient voltage for the lighting circuit and with the battery supplying the lights. In this condition, closer 20 is in its lower position, as shown, whereby the battery circuit direct to the lights is closed. The charging circuit for the battery is from a point 31 of the lighting circuit through conductor 30, which includes the armature of a booster 32, a series coil 33, booster field coil 34 to a point 35 in the battery connection 27, and thence to the battery. Booster 32 may be driven by any suitable connection from a motor 36, such, for instance, as by being mounted on the same shaft, (indicated in dotted lines,) or may be driven by a belt or in any other convenient manner. Motor 36 is in a circuit leading from conductor 3', conductor 37 through the motor brushes 38 to conductor 19 and the brush 11 of the generator. The motor field is indicated at 39. The booster is shown as of the differential type and is provided with a second field winding 40 which is a potential winding in a circuit leading from point 31 through conductor 30 to point 41, through branch 42, contacts 43, 44 of closer 20, branch 45 to a point 46 in conductor 19 leading to the brush 11 of the generator.

As stated above, the generator voltage is automatically regulated by the electrical conditions in the charging circuit. For this purpose a regulating device is included in the circuit of the generator field coil. This regulating device consists, as shown, preferably, of the device 13, which indicates a variable or loose contact device comprising carbon plates 47, 47' and a lever 48 by means of which the pressure on the carbon plates is varied, thereby varying the resistance in the circuit 12 of the generator field coil. In the device shown, the carbon plates 47, 47' are bridged by a pivoted bridge piece 49 connected with each set 47, 47' of carbon plates so that pressure on each set of plates is increased or diminished at the same time. Lever 48 is operated by the combined magnetic effects of coils 33 and 50. Coil 33 is a series coil in the battery charging circuit and coil 50 is a potential coil connected to this circuit from a point 51 in conductor 30 through coil 50, conductor 52 to a point 53 in the circuit 30 on the other side of the booster. Coils 33 and 50 energize core 54 and this core being thus in the fields of both coils 33 and 50 the action of the regulating device is controlled by the combined magnetic effect of the current in these two coils.

The operation of the device is as follows: Assuming that the generator be driven from the car axle, the conditions when the car is at rest, or the speed of the car too low to cause the generator to develop voltage sufficient for the lights, are illustrated in the drawing in which the generator is disconnected by closer 9 being open. The battery is directly connected to the lights through conductor 27, closer 20, and conductor 30. The charging circuit including the booster is short-circuited through contacts 28 and 29 of closer 20. When the speed of the car increases the voltage of the generator rises until the device 16 becomes sufficiently energized to close contact 24. Upon the closing of this contact, closer 9 becomes excited through connections 21, 23 and contacts 7 and 8 are closed. The closing of these contacts connects the generator with the lights. The generator now supplies the lights. The closing of the circuit at contacts 7 and 8 closes the circuit of coil 20ᵃ of closer 20, and this closer on becoming energized operates to open the booster short circuit at the points 28 and 29, and to open the direct connection of the battery with the lights. It also closes the circuit 45 of the potential field 40 of the booster at the points 43 and 44. The battery and booster are thus connected in series relation. As the driving speed of the generator 1 further increases, (with the increase of the speed of the car) the battery receives a charge which is regulated by the booster 32.

Assuming that the generator voltage is maintained substantially constant and that the battery is in a discharged condition, then since the electromotive force of the battery is low it will only require a small booster voltage to produce the proper charging current. The field coils 34 and 40 of the booster are opposing, the coil 40 preponderating. If the coil 40 were alone excited the booster voltage would be much too great and the booster would produce too great a charging current for the battery in a discharged condition. This charging current is cut down by the opposing field 34 which carries the charging current so that if the charging current tends to increase, the strength of field 34 increases, thereby cutting down the excitation of the booster and the charging current so that the charging current is maintained substantially constant for any given battery condition. As the battery becomes charged its voltage rises, thereby tending to decrease the charging current. This weakens the effect of the field 34, thereby increasing the excitation of the booster, so that it tends to bring back the charging current to its former value. It cannot quite accomplish this, however, since an equilibrium is attained resulting in a decrease in charging current and an increase in booster voltage. This action continues as the voltage of the battery rises due to its becoming charged, until the charging current is reduced to practically *nil* and the booster voltage raised to a point substantially sufficient to maintain the battery floating when it is fully charged. The above is on the assumption that the generator voltage is maintained substantially constant. The generator voltage is maintained substantially constant irrespective of changes in speed by means of device 13 and coils 33 and 50. If at any time during the charging of the battery or while the battery is floating the generator voltage tends to increase, this will cause a slight increment in the charging current, causing the strength of coil 33 to be sufficiently increased to increase the resistance of device 13, decrease the generator field strength and thereby bring the voltage of the generator substantially back to its predetermined value.

During the charging of the battery the current in coil 33 varies materially, but this has substantially no effect on the attraction of core 54 as long as the speed of the generator has not varied. This is explained by the fact that as the strength of coil 33 decreases, due to the decrease in charging current as the charging of the battery increases, the strength of coil 50 is correspondingly increased due to the increase in booster voltage. Thus the combined pull of coils 33 and 50 upon the core 54 is kept substantially constant for any given generator speed irrespective of the tapering charging current given the battery. By the sensitive operation of coils 33 and 50, I am able to obtain close regulation.

Although I have described my improvements in great detail nevertheless I do not desire to be limited to such details except as clearly specified hereinafter in the claims, since many changes and modifications may be made without departing from the spirit and scope of my invention.

Having thus described my invention, the following is what I claim as new therein and desire to secure by Letters Patent:

1. In a system of electrical distribution, the combination with a consumption circuit, a generator and a storage battery connected thereto, of a booster for charging the battery, and means arranged to regulate the generator voltage, said means controlled by electrical conditions of a series winding in the charging circuit and a winding in shunt with said booster.

2. In a system of electrical distribution, the combination with a consumption circuit, a generator and a storage battery connected thereto, of a charging circuit for the battery including a differential booster, and means arranged to regulate the generator voltage, said means controlled by the current and potential of the charging circuit.

3. In a system of electrical distribution, the combination with a consumption circuit, a generator connected thereto, a storage battery and a differential booster connected to the consumption circuit, of means to regulate the generator voltage, said means controlled by variations in the potential across the booster.

4. In a system of electrical distribution, the combination with a consumption circuit, a generator connected thereto, a storage battery and booster connected to the consumption circuit, of variable resistance in the generator field circuit, and means controlled by the current and potential in the booster circuit for varying said resistance.

5. In a system of electrical distribution, the combination with a consumption circuit, a generator for supplying the same, a storage battery and booster connected in series with the consumption circuit, of means for regulating the generator voltage, said means comprising a series coil and a potential coil in the booster circuit.

6. In a system of electrical distribution, the combination with a consumption circuit, a generator for supplying the same, and a storage battery, of a charging circuit for the battery, an electromagnetic device in said charging circuit, a voltage regulator for the generator controlled by said electromagnetic device, said electromagnetic device having a winding in series with said booster and another winding in shunt with said booster whereby a substantially constant magnetic effect for a given voltage on the consumption circuit is exerted regardless of current or potential changes in the charging circuit.

7. In a system of electrical distribution, the combination with a consumption circuit, a generator and a storage battery for supplying the same, a booster in series relation with the battery for charging said battery, of a variable resistance in the generator field circuit, an electromagnetic device for varying said resistance, said electromagnetic device having a winding in series with said booster and another winding in shunt with said booster to obtain a substantially constant magnetic effect for a given voltage in the consumption circuit regardless of current or potential variations in the booster circuit.

8. In a system of electrical distribution, the combination with a consumption circuit, a generator, a storage battery and a booster, of means for short-circuiting the booster and connecting the battery direct to the consumption circuit for discharge, means for automatically connecting the generator to the consumption circuit at a predetermined generator voltage, means for automatically opening the booster short-circuit and connecting the battery and booster in series to the consumption circuit for battery charge, and means responsive to electrical conditions in the charging circuit for regulating the generator voltage.

9. In a system of electrical distribution, a consumption circuit, a generator, a storage battery, means arranged to connect the generator and storage battery in parallel directly to the consumption circuit, a booster, means for automatically connecting the booster in series with the battery for battery charge, a variable resistance in the generator field circuit, and an electromagnetic device in the booster circuit for varying said resistance, said electromagnetic device being energized by current and voltage in the booster circuit.

10. In a system of electrical distribution, the combination of a consumption circuit, a generator and a storage battery adapted to be connected in parallel with said circuit, a booster, automatically operated means for opening and closing the circuit of the exciting field coil of the booster, a voltage regulator for the generator and means controlled by the output of the booster for operating said voltage regulator.

11. In a system of electrical distribution, the combination of a consumption circuit, a generator and a storage battery adapted to be connected in parallel with said circuit, a differentially wound booster, automatically operated means for opening and closing the circuit of the exciting field coil of the booster, a voltage regulator for the generator and means controlled by the output of the booster for operating said voltage regulator.

12. In a system of electrical distribution, in combination, a generator, a regulator therefor, a storage battery, translating device, a booster for raising the voltage impressed upon the storage battery, said regulator being responsive to changes in the electrical condition of the battery and means for causing said booster to produce a tapering charge on the battery.

JOHN W. JEPSON.

Witnesses:
WILLIAM P. HAMMOND,
H. C. WORKMAN.